US007032662B2

(12) United States Patent
Malone et al.

(10) Patent No.: US 7,032,662 B2
(45) Date of Patent: *Apr. 25, 2006

(54) METHOD FOR DETERMINING THE EXTENT OF RECOVERY OF MATERIALS INJECTED INTO OIL WELLS OR SUBSURFACE FORMATIONS DURING OIL AND GAS EXPLORATION AND PRODUCTION

(75) Inventors: Scott Malone, Highlands Ranch, CO (US); Earuch Broacha, Tulsa, OK (US); Don Shaw, Denver, CO (US); Tom Hampton, Houston, TX (US)

(73) Assignee: Core Laboratories LP, Houston, TX (US)

( * ) Notice: Subject to any disclaimer, the term of this patent is extended or adjusted under 35 U.S.C. 154(b) by 240 days.

This patent is subject to a terminal disclaimer.

(21) Appl. No.: 10/706,654

(22) Filed: Nov. 12, 2003

(65) Prior Publication Data
US 2004/0094297 A1 May 20, 2004

Related U.S. Application Data

(63) Continuation-in-part of application No. 10/154,130, filed on May 23, 2002, now Pat. No. 6,659,175.

(60) Provisional application No. 60/293,071, filed on May 23, 2001.

(51) Int. Cl.
*E21B 43/267* (2006.01)
*E21B 47/00* (2006.01)
*G01N 33/24* (2006.01)

(52) U.S. Cl. ............... 166/252.6; 73/152.42; 166/250.1; 166/250.12; 166/280.2; 507/267; 507/907; 507/924

(58) Field of Classification Search ............. 166/250.1, 166/250.12, 252.6, 280.2, 308.2; 73/152.42; 175/40, 42; 250/259, 260; 436/27, 28, 29; 507/267, 906, 907, 922, 924
See application file for complete search history.

(56) References Cited

U.S. PATENT DOCUMENTS

| 2,207,348 | A | 7/1940 | Jones et al. ................ 436/29 |
| 2,869,642 | A | 1/1959 | McKay et al. ......... 166/250.01 |
| 3,059,909 | A | 10/1962 | Wise ........................... 261/39 |
| 3,180,142 | A | 4/1965 | Bombarieri ............... 73/152.18 |
| 3,301,723 | A | 1/1967 | Chrisp ........................ 149/20 |
| 3,316,965 | A | 5/1967 | Watanabe |
| 3,492,147 | A | 1/1970 | Young et al. ................. 427/5 |
| 3,856,468 | A | 12/1974 | Keller ........................ 436/27 |
| 3,888,312 | A | 6/1975 | Tiner et al. |
| 3,902,362 | A | 9/1975 | Tomich et al. ................ 73/155 |
| 4,055,399 | A | 10/1977 | Parrish .................. 23/230 EP |
| 4,273,187 | A | 6/1981 | Satter et al. |
| 4,352,674 | A | 10/1982 | Fery ............................ 436/27 |
| 4,373,586 | A | 2/1983 | Hunt, III ................... 166/263 |
| 4,415,805 | A | 11/1983 | Fertl et al. ................. 250/260 |
| 4,681,245 | A | 7/1987 | Harvey ...................... 222/643 |
| 4,807,469 | A | 2/1989 | Hall ........................ 73/152.19 |
| 4,840,292 | A | 6/1989 | Harvey ........................ 222/1 |
| 5,049,743 | A | 9/1991 | Taylor et al. ............... 250/303 |
| 5,077,471 | A | 12/1991 | Smith, Jr. et al. .......... 250/260 |
| 5,246,860 | A | 9/1993 | Hutchins et al. ............. 436/27 |
| 5,279,967 | A | 1/1994 | Bode .......................... 436/56 |
| 5,410,152 | A | 4/1995 | Gadeken .................... 250/260 |
| 5,439,055 | A | * 8/1995 | Card et al. ............... 166/280.2 |
| 5,855,243 | A | * 1/1999 | Bragg ........................ 166/275 |
| 5,929,437 | A | 7/1999 | Elliott et al. ............... 250/259 |
| 5,986,030 | A | 11/1999 | Murray et al. ............. 526/268 |
| 6,003,365 | A | 12/1999 | Pope et al. ............... 73/152.39 |
| 6,016,191 | A | 1/2000 | Ramos et al. ................ 356/70 |
| 6,025,200 | A | 2/2000 | Kaish et al. ................. 436/56 |
| 6,075,611 | A | 6/2000 | Dussan V. et al. .......... 356/432 |
| 6,076,046 | A | 6/2000 | Vasudevan et al. ........... 702/12 |
| 6,125,934 | A | 10/2000 | Lenn et al. ............ 166/250.12 |
| 6,148,913 | A | 11/2000 | Collins ...................... 166/263 |
| 6,192,985 | B1 | 2/2001 | Hinkel et al. ............... 166/280 |
| 6,645,769 | B1 * | 11/2003 | Tayebi et al. ................ 436/56 |
| 2001/0036667 | A1 * | 11/2001 | Tayebi et al. ................ 436/56 |
| 2002/0020527 | A1 * | 2/2002 | Kilaas et al. .......... 166/250.01 |

FOREIGN PATENT DOCUMENTS

WO    WO 02/095189    * 11/2002

OTHER PUBLICATIONS

Michael C. Adams et al.; *Thermal Stabilities of Aromatic Acids as Geothermal Tracers*, http://www.egi.utah.edu/geothermal/Tracer/T_Studies/, Sep. 21, 1998, pp. 1-23, 3 pages of references.
Michael C. Adams et al.; *The Dixie Valley, Nevada Tracer Test*, ESL—93011—PR, http://www.egi.utah.edu/geothermal/Tracer/T_Studies/, Mar. 3, 1998, Table of Contents, pp. 1-11, Appendix A, Appendix B.

(Continued)

*Primary Examiner*—George Suchfield
(74) *Attorney, Agent, or Firm*—Madan, Mossman & Sriram, P.C.

(57) ABSTRACT

Disclosed is a method of determining the extent of recovery of materials injected into oil wells or subsurface formations. The method includes injection of one or more tracers into an oil well or into a formation. Included in the method are the steps of introducing a material of interest into the oil well or into the subsurface formation associated with the bore of the oil well; introducing a tracer into the oil well or into the subsurface formation associated with the bore of the oil well; recovering from the oil well a production fluid, analyzing the production fluid for a concentration of the chemical tracer present in the production fluid; and calculating the amount of material of interest recovered from the oil well using the concentration of the chemical tracer present in the production fluid as a basis for the calculation.

21 Claims, No Drawings

OTHER PUBLICATIONS

Michael C. Adams et al.; *Kinetics of Fluorscein Decay and Its Application as a Geothermal Tracer*, http://www.egi.utah.edu/geothermal/Tracer/T_Studies/, Mar. 3, 1998, pp. 1-27.

Michael C. Adams et al.; *The Application of Halogenated Alkanes as Vapor-Phase Tracers: A Field Test in the Southeast Geysers*, http://www.egi.utah.edu/geothermal/Tracer/T_Studies/, Mar. 3, 1998, 9 pgs.

Joseph J. Beall et al.; *R-13 Tracing of Injection in the Geysers*, http://www.egi.utah.edu/geothermal/Tracer/T_Studies/, Mar. 3, 1998, pp. 1-11.

Michael C. Adams et al., *Rhodamine WT as a Geothermal Tracer—A Field Test a Steamboat Hills*, Nevada, http://www.egi.utah.edu/geothermal/Tracer/T_Studies/, Mar. 3, 1998, 13 pgs.

Alcohols, http://www.egi.utah.edu/geothermal/Tracer/T_Studies/,Mar. 3, 1998.

Claus Ulrich Galdiga; *Trace Analysis of Fluorinated Aromatic Carboxylic Acids in Aqueous Reservoir Fluids by HPLC*, J. Liq. Chrom. & Rel. Technol., 21(6), pp. 855-868 (1998).

Ofer Dahan et al.; *Analytical Procedure for Simultaneous Use of Seven Fluorobenzoates in Multitracer Tests*, vol. 39, No. 3, Ground Water, May-Jun. 2001, pp. 366-370, 2 Tables, 5 Figs.

T. Bjørnstad et al.; *Interwell Tracer Technology in Oil Reservoirs*: State-of-the-Art, pp. 261-268, 3 Tables, 2 Figs.

Tor Bjørnstad; *Recent and Current Oil Field Tracer Development for Interwell Application*2nd Tracer Workshop, University of Texas at Austin, Nov. 14&15, 1994, pp. 101-112, 2 Table, 18 Figs..

Joseph S. Tang; *Partitioning Tracers and In-Situ Fluid-Saturation Measurements*, SPE Formation Evaluation, Mar. 1995, pp. 33-39, 11 Figs.

Claus Ulrich Galdiga et al.; *Ultra trace determination of fluorinated aromatic carboxylic acids in aqueous reservoir fluids by solid phase extraction in combination with negative ion chemical ionisation mass spectrometry after derivatisation with pentafluorobenzyl bromide* Fresenius J. Anal Chem (1998) 361:797-802pp. 795-802, 3 Tables, 4 Figs..

\* cited by examiner

METHOD FOR DETERMINING THE EXTENT OF RECOVERY OF MATERIALS INJECTED INTO OIL WELLS OR SUBSURFACE FORMATIONS DURING OIL AND GAS EXPLORATION AND PRODUCTION

RELATED APPLICATIONS

This application is a continuation-in-part of U.S. patent application Ser. No. 10/154,130, filed on May 23, 2002 now U.S. Pat. No. 6,659,175 which application claims priority from U.S. Provisional Patent Application Ser. No. 60/293,071 filed on May 23, 2001.

BACKGROUND OF THE INVENTION

1. Field of the Invention

The present invention relates to a method for determining the extent of recovery of materials injected into an oil well during oil and gas exploration and production. The present invention particularly relates to a method for determining the extent of recovery of materials injected into an oil well during oil and gas exploration and production using chemical tracers.

2. Background of the Art

The present Invention relates generally to hydrocarbon (oil and gas) production from wells drilled in the earth, hereinafter referred to as "oil wells." Drilling a hole into the earth to reach oil and gas bearing formations is expensive which limits the number of wells that can be economically drilled. It follows then that it is desirable to maximize both and the overall recovery of hydrocarbon held in the formation and the rate of flow from the subsurface formation to the surface, where it can be recovered.

One way in which to maximize production is the process known as fracturing. Hydraulic fracturing involves literally breaking or fracturing a portion of the hydrocarbon bearing formation surrounding an oil well by injecting a specialized fluid into the wellbore directed at the face of the geologic formation at pressures sufficient to initiate and/or extend a fracture in the formation. Ideally, what this process creates is not a single fracture, but a fracture zone, i.e., a zone having multiple fractures, or cracks in the formation, through which hydrocarbon can more readily flow to the wellbore.

Creating a fracture in a hydrocarbon-bearing formation requires several materials. Often these materials, if not removed from the oil well, can interfere with oil and gas production. Even the drilling mud used to lubricate a drill bit during the drilling of an oil well can interfere with oil and gas production. Taking too long to remove such materials can increase the cost to the operator of the well by delaying production and causing excess removal expenses. Not being thorough in removing such materials can increase the cost to the operator of the well through lower production rates and possible lost production.

Measures taken to remove unwanted or unneeded materials are usually inexact. Sometimes additional fluids are used to flush out unwanted materials in the well bore. In other situations, reservoir fluids flow can make estimating return flow very difficult, particularly if the reservoir fluids are incompatible with the injected materials. It would be desirable in the art of oil and gas production to be able to determine how much of a given material is left in an oil well after a drilling, fracturing or any other operation requiring the injection of materials into an oil well. It would be particularly desirable if such a determination could be made using an inexpensive and environmentally benign method.

SUMMARY OF THE INVENTION

In one aspect, the present invention is a method for determining the extent of recovery of materials injected into an oil well comprising the steps of: a) admixing a material to be injected into an oil well with a chemical tracer compound at a predetermined concentration; b) injecting the admixture into an oil well or an offset well associated with an oil well; c) recovering from the oil well a production fluid; d) analyzing the production fluid for the concentration of the chemical tracer present in the production fluid; and e) calculating the amount of admixture recovered from the oil well using the concentration of the chemical tracer present in the production fluid as a basis for the calculation.

In another aspect, the present invention is a method for determining the extent of recovery of a material of interest injected into an oil well or a subsurface formation associated with a bore of the oil well comprising the steps of: a) introducing a material of interest into the oil well or into the subsurface formation associated with the bore of the oil well; b) introducing a tracer into the oil well or into the subsurface formation associated with the bore of the oil well; c) recovering from the oil well a production fluid; d) analyzing the production fluid for the concentration of the chemical tracer present in the production fluid; and e) calculating the amount of material of interest recovered from the oil well using the concentration of the chemical tracer present in the production fluid as a basis for the calculation.

DESCRIPTION OF PREFERRED EMBODIMENTS

As already defined, the term "oil well" means hydrocarbon (oil and gas) production wells drilled in the earth. The method of the present invention can also be used with other types of wells that are drilled in the earth and can require stimulation by hydraulic fracturing, such as a well used for water flooding in secondary recovery operations in oil and gas production. For the purposes of the present invention, the term "oil well" means hydrocarbon production wells, such as those that can require stimulation by hydraulic fracturing but also means any other type of well used in oil and gas production. The method of the present invention can be used in either gas wells or oil wells, as well as in those wells producing significant quantities of both oil and gas.

In one embodiment, the present invention is a method for determining the amount of fracture materials recovered after the stimulation of an oil well by means of hydraulic fracturing. Creating a fracture in a hydrocarbon-bearing formation requires several materials. Most often these include a carrier fluid, a viscosifier, a proppant, and a breaker. Other components that are sometimes added include materials to control leak-off, or migration of the fluid into the fracture face, gel stabilizers, surfactants, clay control agents and crosslinkers.

The purpose of the first fracturing component is to first create/extend a fracture in an oil and gas producing formation and then, once it is opened enough, to deliver proppant. The carrier fluid together with proppant material is injected into the fractured formation. The carrier fluid is simply the means by which the proppant and breaker are carried into the formation.

Numerous substances can act as a suitable carrier fluid, though they are generally aqueous-based solutions that have been either gelled or foamed or both. Thus, the carrier fluid is often prepared by blending a polymeric gelling agent with an aqueous solution although sometimes the carrier fluid is oil-based or a multi-phase fluid. Often, the polymeric gelling agent is a solvatable polysaccharide, e.g. galactomannan gums, glycomannan gums, and cellulose derivatives. The purpose of the solvatable or hydratable polysaccharides is to thicken the aqueous solution so proppant can be suspended in the solution for delivery into the fracture.

The polysaccharides function as viscosifiers, increasing the viscosity of the aqueous solution by 10 to 100 times, or even more. During high temperature applications, a cross-linking agent is further added which further increases the viscosity of the solution. The borate ion has been used extensively as a crosslinking agent for hydrated guar gums and other galactomannans to form aqueous gels, e.g., U.S. Pat. No. 3,059,909. Other demonstrably suitable cross-linking agents include: titanium as disclosed in U.S. Pat. No. 3,888,312, chromium, iron, aluminum, and zirconium as disclosed in U.S. Pat. No. 3,301,723. More recently, viscoelastic surfactants have been developed which obviates the need for thickening agents, and hence cross-linking agents.

Most relevant to the present invention is the final step of the fracturing process. The process of removing the fluid from the fracture once the proppant has been delivered is referred to as "fracture clean-up." For this, the final component of the fracture fluid becomes relevant: the breaker. The purpose of the breaker is to lower the viscosity of the fluid so that it is more easily removed from the fracture.

In another aspect, the present invention is a method for determining the amount of drilling fluid recovered after the completion of an oil well. A drilling fluid is a fluid specially designed to be circulated through a wellbore as the wellbore is being drilled to facilitate the drilling operation. The circulation path of the drilling fluid typically extends from the wellhead down through the drill pipe string to the drilling face and back up through the annular space between the drill pipe string and wellbore face to the wellhead. The drilling fluid performs a number of functions as it circulates through the wellbore including cooling and lubricating the drill bit, removing drill cuttings from the wellbore, aiding in support of the drill pipe and drill bit, and providing a hydrostatic head to maintain the integrity of the wellbore walls and prevent well blowouts.

There are a number of different types of conventional drilling fluids including compositions termed "drilling muds." Drilling muds comprise high-density dispersions of fine solids in an aqueous liquid or a hydrocarbon liquid. An exemplary drilling mud is a dispersion of clay and/or gypsum in water. The solid component of such a dispersion is termed a "weighting agent" and is designed to enhance the functional performance of the drilling fluid.

In the practice of the present invention, the extent of recovery of materials injected into a oil well during fracturing, drilling and the like is determined by preparing the fracture materials or drilling fluids to be injected into an oil well and admixing therewith a chemical tracer compound at a predetermined concentration. The tracer acts as a model for determining the amount of these materials recovered. For purposes of the present invention, these materials are referred to as the materials for which the tracers are used as a model and sometimes just as the materials of interest.

The tracers useful with the present invention include any known to those ordinary skill in the art of using chemical tracers in oil and gas operations to be useful, but preferably are those which can be detected at concentrations low enough to make their use economically practical in such operations and low enough to interfere with the carrier fluid or other materials present in the oil well. Preferably the chemical tracers useful with the present invention include but are not limited to: fluorinated benzoic acids including 2-fluorobenzoic acid; 3-fluorobenzoic acid; 4-fluorobenzoic acid; 3,5-difluorobenzoic acid; 3,4-difluorobenzoic acid; 2,6-difluorobenzoic acid; 2,5-difluorobenzoic acid; 2,3-difluorobenzoic acid; 2,4-difluorobenzoic acid; pentafluorobenzoic acid; 2,3,4,5-tetrafluorobenzoic acid; 4-(trifluoromethyl)benzoic acid; 2-(trifluoromethyl)benzoic acid; 3-(trifluoromethyl)benzoic acid; 3,4,5-trifluorobenzoic acid; 2,4,5-trifluorobenzoic acid; 2,3,4-trifluorobenzoic acid; 2,3,5-trifluorobenzoic acid; 2,3,6-trifluorobenzoic acid; 2,4,6-trifluorobenzoic acid; and the like, perfluoromethylcyclopentane (PMCP), perfluoromethylcyclohexane (PMCH), perfluorodimethylcyclobutane (PDMCB), m-perfluorodimethylcyclohexane (m-PDMCH), o-perfluorodimethylcyclohexane (o-PDMCH), p-Perfluorodimethylcyclohexane (p-PDMCH), perfluorotrimethylcyclohexane (PTMCH), perfluoroethylcyclohexane (PECH), perfluoroisopropylcyclohexane (IPPCH), and the like.

Any chemical compound can be used as tracer with the present invention if: it is not present at a measurable level in the reservoir fluids being produced from the Well being tested, it can be measured at levels sufficiently low to allow its use to be economical, and the tracer does not interfere or interact undesirably with other materials present in the oil well at the levels used. Preferably, the tracers are detectable at a range of from about 1 parts per trillion to about 10,000 parts per million in the fluid being analyzed. Preferably the tracers are detectable at a range of from 5 parts per trillion to about 1,000 parts per million. More preferably the tracers are detectable at a range of from 100 parts per trillion to about 100 parts per million. At concentrations greater than about 1000 parts per million, the use of some tracers can become prohibitively expensive or cause unacceptable interactions with other materials present in an oil well.

In one embodiment of the present invention, the tracers are desirably compatible with the fluids wherein they are used. Preferably, the tracer selected is chosen to be more compatible with the injected materials than with the reservoir fluids which may recovered concurrently with the injected materials. The fluorinated benzoic acids are particularly preferred as tracers for the present invention because they are compatible in both aqueous fluids as a salt and in organic based fluids as an acid.

In an alternative embodiment of the present invention, more than one tracer can be used to measure multiple operations in the same well. For example, oil wells often have more than one producing strata or zone. In the practice of the present invention, a fracture job could be done on one strata using a first tracer and a fracture job could be done on another strata using a second tracer. In recent years, horizontal drilling has allowed for the drilling of multiple bores terminating in a common bore which connects to the surface. In multilateral wells such as these, several different tracers could be used to keep track of concurrent recovery of materials from the several legs (lateral bores) of such wells.

In a similar but different embodiment, the method of the present invention is used in a process to fracture stimulate multiple intervals in single or multiple formations, within the same wellbore. This is performed by: (i) perforating a first interval; (ii) stimulating that first interval; (iii) isolating the first interval, (iv) perforating a second interval; (v) stimulating the second interval; (iii) isolating the second interval; and continuing this pattern. There may be as many as 12 or 13 such stimulations done on a single wellbore in a short period of time, sometimes only weeks or even days. The operator of the well will then retrieves the isolation mechanism, typically a bridge plug, between each interval and begins to clean up all of the stimulated intervals, often at one time. The method of the present invention is very useful in such an operation because a different tracer can be used in each interval and thus can be individually detected during the flowback. The method of the present invention thereby provides an opportunity for a well operator to determine which to what extent each of the intervals is contributing to the flowback.

In the practice of the present invention, a tracer is admixed with a material that is to be injected into an oil well. The tracer can be premixed with the injection material or it can be admixed as it is injected. Preferably the tracer is admixed with the injection material through a static mixer as the admixture is pumped into the oil well. Any method known to those of ordinary skill in the art of admixing and injecting materials into oil wells can be used with the method of the present invention.

In one preferred embodiment, where a stream of fluids used for a hydraulic fracture job is being pumped into an oil well, a ten percent solution of a fluorinated benzoic acid salt tracer is pumped into the stream of fluids being used for a hydraulic fracture job, just upstream of a static mixer, using a peristaltic pump to meter the tracer into the stream of fluids. In another preferred embodiment, the pump used to feed the tracer solution into the fracture fluids is a triplex or a centrifugal pump. In either embodiment, the metering pump is adjusted such that the tracer is injected into the fracture fluids at a rate that results in a predetermined tracer concentration appropriate for the conditions in the oil well. The same process can also be used for injecting tracer into a stream of drilling fluids.

In the practice of the present invention, the chemical tracer compound is admixed with a material to be injected into an oil well at a predetermined concentration. The concentration of the tracer is above its detection limits and preferably at a concentration of ten times its detection limits. In the practice of the present invention, preferably the concentrations of the tracer and the total amount of admixture injected is determined and known.

After the fluid injected into an oil well during the practice of the present invention has performed its purpose, it is preferably recovered. Most often, the injected materials are recovered along with reservoir fluids as a production fluid. In the practice of hydraulic fracturing of wells, this phase of the process is the fracture clean up. In conventional practices, this process can take an extended amount of time where up to 72 hours would not be unusual.

In the practice of the present invention, the recovered materials are tested for tracer concentration and the amount of material recovered determined. At this point, the well operator can make an informed decision regarding whether to continue clean up or begin production. An advantage of the present invention is that it allows the well operator to avoid unnecessary down time, but prevents premature termination of clean up operations. Down time and premature termination of clean up operations can be very expensive to well operators.

The extent of recovery of materials injected including a tracer of the present invention is preferably determined by using a mass balance approach. Therein, the total amount of tracer admixed with the injected material is a known. A homogenous sample of production fluid is tested for tracer concentration and the amount of tracer recovered is thereby determined. The amount of injected admixture recovered is then determined using the formula:

$$AMT_r = ((T_r/T_i) \times AMT_i)$$

wherein $AMT_r$ is the amount of injected admixture recovered, $T_i$ is the amount of tracer injected; $T_r$ is the amount of tracer recovered; and $AMT_i$ is the amount of materials injected. $T_r$ is determined by multiplying the concentrations of the tracer in the production fluid by the total quantity of production fluid recovered.

Where a mass balance approach is not possible or desirable, a relative rate of recovery can also be determined by measuring the concentration of tracer in the production fluids recovered from an oil well as a function of time. In a process such as this, samples of production fluid being recovered, from the well are taken, analyzed for tracer concentration that is then plotted against time and/or flow rates. This can also be a desirable way for an operator to decide when to terminate clean up and begin production from an oil well.

The tracers used with the method of the present invention can be analyzed by any method known to those of ordinary skill in the art of doing such analyses to be useful. For example, in one method of analyzing for a fluorinated benzoic acid tracer of the present invention, an emulsion of hydrocarbons, water and naturally occurring inorganic materials is first acidified with dilute hydrochloric acid and then extracted using a nonpolar solvent. The organic phase is then admixed with a 1 normal sodium hydroxide solution and then extracted with water. The water is then reacidified and extracted with methylene chloride. The recovered methylene chloride is then analyzed for the tracer, optionally after being reduced in volume by evaporation.

In addition to methylene chloride, other solvents can be used. For example, cyclohexane, normal hexane, pentane, can be used. While not preferred, organic solvents such as benzene and toluene can also be used as long as care is used to make sure that the solvent does not have a significant background level of the tracer being used.

In the case of the fluorinated benzoic acid tracers, very low levels of tracer can be determined by taking advantage of the carboxylate group to first separate the tracer from non-acidic organics as a salt and then, in a second step, concentrate the tracer into an organic solvent by returning it to its acid form and then extracting it from an aqueous phase.

There are many instrumental methods of analyzing for the tracer compounds useful with the method of the present invention, including but not limited to, gas chromatography (GC) using flame ionization detectors, electron capture detectors, and the like; liquid chromatography (LC); infrared spectroscopy; combination instrumentation such as Fourier transform infrared spectroscopy, GC-mass spectroscopy, LC-mass spectroscopy, and the like.

When especially demanding analytical conditions arise, other means of doing the analyses can also be used, including using biologically active tracers for immunoassay, preparing functional derivatives of the tracers including, for example, esterifacation with more easily analyzed alcohols, and the like.

To achieve low levels of detection, it is necessary that standard laboratory practices be maintained. Fluids produced from oil wells can contain hazardous or toxic materials and steps should be taken to ensure the safety of lab personnel including, but not limited to, avoiding fire hazards, scrubbing or removing $H_2S$ and other harmful gasses, and limiting skin contact with possible carcinogens. Quality assurance should be done as with any analytical procedure including using internal standards, external standards, and the like to ensure the accuracy of analyses. Recovery efficiencies can vary from oil well to oil well. It is important not to overlook simple steps such as accurately measuring sample volumes and filtering irrelevant solids from samples prior to analysis. Any analytical method that can detect the chemical tracers useful with the method of the present invention at useful levels can be used with the present invention.

In another embodiment of the present invention, the tracer is in the form of a coating on a solid substrate or as a fluid or solid trapped in the pores of a porous support. The tracer can also be in the form of a pellet admixed with solids soluble in the production fluid. In these embodiments, the tracer is released gradually into production fluid over time. When co-injected with solids such as proppant or pack sand, this use of the tracers of the present invention would allow for an estimation of the amount of co-injected solids in place in the well. If too little tracer were detected after completion of the injection, or if the tracer level decreased too quickly after completion, an oil well operator would know that the injected solids were either not properly placed in the well or are being washed out or otherwise being removed from the oil well.

In a similar embodiment, the present invention can be practice wherein the tracer is in the form of an encapsulated liquid or solid. The encapsulating agent can selected from natural and synthetic oils, natural and synthetic polymers and enteric polymers and mixtures thereof. Preferably the encapsulating agent is selected from crosslinked vegetable oils, natural or synthetic polymers (such as polyvinylchloride and nylon), enteric polymers (such as acrylic resin polymers, cellulose acetate phthalate, carboxylated polymers, aqueous methacrylic polymers, and mixtures thereof.

The process of encapsulating the tracers of the present invention somewhat depends upon both the tracer and the encapsulating agent selected. In one embodiment the encapsulation process involves the coating of solid organic tracer with vegetable oil. One of skill in the art should be capable of accomplishing this by the combination of the tracer and vegetable oil in an agglomerator or other similar devise that coats solid particles with a protective coating. Alternatively the tracer can be encapsulated within polyvinylchloride or other polymers. There are many ways that those skilled in the art can encapsulate materials. Among these are in situ polymerization, interfacial polymerization, complex coacervation, polymer/polymer phase separation, desolvation, extrusion, thermal gelation, and ionic gelation. Any form of encapsulation known to those of ordinary skill in the art of encapsulation can be used with the present invention subject to the limitation that the encapsulation must release the tracer in a predictable manner one the tracer is downhole.

While the method of the present invention is particularly suitable for use with fracturing operations in an oil and gas well, it can be used with other types of operations and in other than just the main or primary production wellbore. For example, the method of the present invention can be used with chemical stimulation methods. Other stimulation methods that can be used with the present invention include, but are not limited to "break down"; "mini frac tests"; water block treatments; and in situ fluid compatibility testing for use with water based fluids. The method of the present invention can be used with almost any process wherein materials of interest are introduced to a wellbore and/or producing formation and wherein it would be desirable to be able to determine the extent that such materials have been recovered.

In one embodiment of the present invention, the tracers are introduced downhole into a production well. This is not the only way in which to practice the method of the present invention. In another embodiment, the tracers are introduced into the well using an offset well. An offset well is an existing wellbore close to the subject oil well that provides information for planning or operating the subject oil well. In this embodiment, the tracers and the materials for which the tracers are going to be used to model recovery can both be introduced into the formation using an offset well. In a related embodiment, the offset well can have a junction with the bore of a subject oil well. In still another embodiment, either one of the tracer or material for which the tracer will be a model can be injected into an offset well with the other material being introduced downhole through the subject oil well.

In a preferred embodiment, the tracers are admixed with the material for which they will serve as a model, but in another embodiment, the materials of interest and tracers are introduced separately. For example, the tracers of the present invention can be introduced downhole into an oil well or offset well using a dump bailer or other means of introducing small amounts of solids or slurries downhole. Downhole injection using a surface or even a subsurface pump is also within the scope of the present invention. The method of the present invention can be used with any scheme for introducing the material to be modeled and the tracers downhole so long as there is a known relationship between the tracers and the material for which the tracers will serve as a model that will allow for the calculation of recovery of the material of interest using the recovery of the tracers.

The following examples are provided to illustrate the present invention. The examples are not intended to limit the scope of the present invention and they should not be so interpreted. Amounts are in weight parts or weight percentages unless otherwise indicated.

EXAMPLE

A field application of the method of the present invention is performed in an oil and gas well penetrating the Codell formation in Weld County, Colorado. A first material (referred to in the art of hydraulic fracturing as a "stage" or, in this case, "the first stage") is prepared for fracture injection into the well including 0.15 gallons per thousand gallons (gpt) buffer and 1 gpt of GBW23L* which is a high temperature oxidizing gel breaker, 40 pounds per thousand pounds (ppt) gelling agent, and a first fluorinated benzoic acid tracer; in water. A second stage is prepared which includes 1-to-2 lbs/gal proppant; 0.15 gpt buffer; 1 gpt of GBW23L; 1 gpt BC31* gel breaker activator which is a low temperature oxidizing breaker activator; 40 ppt gelling agent; a second fluorinated benzoic acid tracer; and 2.5 (ppt) gel stabilizer, in water. A third stage is prepared which includes 3 lbs/gal proppant; 40 ppt gelling agent; 0.20 gpt buffer; 1 gpt GBW23L; 1 gpt BC31; 1 ppt Ultra Perm* breaker which is a low temp oxidizing breaker; 1 ppt gel stabilizer; a third fluorinated benzoic acid tracer; and 1.5 ppt gel crosslinking agent, in water. A fourth stage is prepared which includes 4 lbs/gal proppant; 40 ppt gelling agent; 0.20 gpt buffer; 3 ppt GBW5 breaker which is a low temp oxidizing breaker; a fourth fluorinated benzoic acid tracer, and 1 ppt Ultra Perm. *GBW-23L, BC31, GBW5 and Ultra Perm are trade designations of BJ Services.

Each stage is injected, in turn, under fracture injection conditions. The flow back is tested for the presence and relative concentration of each tracer using a GC-mass spectrometer. The comparative amounts of tracer returned are: (A) Fourth fluorinated benzoic acid tracer highest concentration; (B) Second fluorinated benzoic acid tracer next highest concentration; (C) First fluorinated benzoic acid tracer next highest concentration; and (D) Third fluorinated benzoic acid tracer lowest concentration.

While not wishing to be bound by any theory, it can be concluded that the third material injected had the most stable gel structure, effectively locking it into the formation and thus had the lowest flow back and resulting in the lowest recovery of tracer. It can also be concluded that the fourth material, being last injected and replete with gel breaking materials would have the greatest flowback and thus the highest recovery of tracers.

What is claimed is:

1. A method for determining the extent of recovery of materials injected into an oil well comprising:
   a) admixing a material to be injected into an oil well with a chemical tracer compound at a predetermined concentration;
   b) injecting the admixture into an oil well or an offset well associated with an oil well;
   c) recovering from the oil well a production fluid;
   d) analyzing the production fluid for a concentration of the chemical tracer present in the production fluid; and
   e) calculating the amount of admixture recovered from the oil well using the concentration of the chemical tracer present in the production fluid as a basis for the calculation.

2. The method of claim 1 wherein the tracer is selected from the group consisting of fluorinated benzoic acids, perfluoromethylcyclopentane (PMCP), perfluoromethylcyclohexane (PMCH), perfluorodimethylcyclobutane (PDMCB), m-perfluorodimethylcyclohexane (m-PDMCH), o-perfluorodimethylcyclohexane (o-PDMCH), p-Perfluorodimethylcyclohexane (p-PDMCH), perfluorotrimethylcyclohexane (PTMCH), perfluoroethylcyclohexane (PECH), and perfluoroisopropylcyclohexane (IPPCH).

3. The method of claim 2 wherein the tracer is a fluorinated benzoic acid.

4. The method of claim 3 wherein the fluorinated benzoic acid is selected from the group consisting of including 2-fluorobenzoic acid; 3-fluorobenzoic acid; 4-fluorobenzoic acid; 3,5-difluorobenzoic acid; 3,4-difluorobenzoic acid; 2,6-difluorobenzoic acid; 2,5-difluorobenzoic acid; 2,3-difluorobenzoic acid; 2,4-difluorobenzoic acid; pentafluorobenzoic acid; 2,3,4,5-tetrafluorobenzoic acid; 4-(trifluoro-methyl)benzoic acid; 2-(trifluoromethyl)benzoic acid; 3-(trifluoro-methyl)benzoic acid; 3,4,5-trifluorobenzoic acid; 2,4,5-trifluorobenzoic acid; 2,3,4-trifluorobenzoic acid; 2,3,5-trifluorobenzoic acid; 2,3,6-trifluorobenzoic acid; and 2,4,6-trifluorobenzoic acid.

5. The method of claim 1 wherein the tracer is present in the admixture injected into an oil well at a concentration of at least about 1 part per trillion.

6. The method of claim 5 wherein the tracer is present in the admixture injected into an oil well at a concentration of less than or equal to 10,000 parts per million.

7. The method of claim 6 wherein the tracer is present in the admixture injected into an oil well at a concentration of from about 100 parts per trillion to about 100 parts per million.

8. The method of claim 1 wherein the material injected into the oil well is a hydraulic fracturing fluid.

9. The method of claim 1 wherein the material injected into the oil well is a chemical stimulation fluid.

10. The method of claim 1 wherein the amount of injected admixture recovered is determined using the formula:

$$AMT_r = ((T_r/T_i) \times AMT_i)$$

Wherein:
   (i) $AMT_r$ is the amount of injected admixture recovered,
   (ii) $T_i$ is the amount of tracer injected;
   (iii) $T_r$ is the amount of tracer recovered;
   (iv) $AMT_i$ is the amount of admixture injected; and
   (v) $T_r$ is determined by multiplying the concentrations of the tracer in the production fluid by the total quantity of production fluid recovered.

11. The method of claim 1 wherein the tracer is in the form of a coating on a solid support.

12. The method of claim 1 wherein the tracer is in the form of a liquid or solid within the pores of a porous support.

13. The method of claim 1 wherein the tracer is in the form of an encapsulated liquid or solid.

14. A method for determining the extent of recovery of a material of interest injected into an oil well or a subsurface formation associated with a bore of the oil well comprising:
   a) introducing a material of interest into the oil well or into the subsurface formation associated with the bore of the oil well;
   b) introducing a tracer into the oil well or into the subsurface formation associated with the bore of the oil well;
   c) recovering from the oil well a production fluid;
   d) analyzing the production fluid for a concentration of the chemical tracer present in the production fluid; and
   e) calculating the amount of material of interest recovered from the oil well using the concentration of the chemical tracer present in the production fluid as a basis for the calculation.

15. The method of claim 14 wherein the tracer is a fluorinated benzoic acid.

16. The method of claim 15 wherein the fluorinated benzoic acid is selected from the group consisting of including 2-fluorobenzoic acid; 3-fluorobenzoic acid; 4-fluorobenzoic acid; 3,5-difluorobenzoic acid; 3,4-difluorobenzoic acid; 2,6-difluorobenzoic acid; 2,5-difluorobenzoic acid; 2,3-difluorobenzoic acid; 2,4-difluorobenzoic acid; pentafluorobenzoic acid; 2,3,4,5-tetrafluorobenzoic acid; 4-(trifluoro-methyl)benzoic acid; 2-(trifluoromethyl)benzoic acid; 3-(trifluoro-methyl)benzoic acid; 3,4,5-trifluorobenzoic acid; 2,4,5-trifluorobenzoic acid; 2,3,4-trifluorobenzoic acid; 2,3,5-trifluorobenzoic acid; 2,3,6-trifluorobenzoic acid; and 2,4,6-trifluorobenzoic acid.

17. The method of claim 16 wherein the tracer is introduced into the oil well or subsurface formation through the oil well.

18. The method of claim 16 wherein the tracer is introduced into the oil well or subsurface formation through an offset well.

19. The method of claim 16 wherein the material of interest is introduced into the oil well or subsurface formation through the oil well.

20. The method of claim 16 wherein the material of interest is introduced into the oil well or subsurface formation through an offset well.

21. The method of claim 14 wherein the amount of material of interest recovered is determined using the formula:

$$AMT_r = ((T_r/T_i) \times AMT_i)$$

Wherein:
   (i) $AMT_r$ is the amount of material of interest recovered, (ii) $T_i$ is the amount of tracer injected;
(iii) $T_r$ is the amount of tracer recovered;
(iv) $AMT_i$ is the amount of material of interest injected; and (v) $T_r$ is determined by multiplying the concentrations of the tracer in the production fluid by the total quantity of production fluid recovered.

* * * * *